United States Patent [19]

Harder, Jr.

[11] 4,057,214

[45] Nov. 8, 1977

[54] SEAT WITH ENERGY ABSORBING MOUNTING

[75] Inventor: Arthur J. Harder, Jr., Franklin Park, Ill.

[73] Assignee: Coach and Car Equipment Corporation, Elk Grove Village, Ill.

[21] Appl. No.: 708,481

[22] Filed: July 26, 1976

[51] Int. Cl.² .......................................... A47C 3/025
[52] U.S. Cl. .................................... 248/399; 248/22; 297/452; 297/300
[58] Field of Search .................. 297/300, 46, 452; 248/399, 375, 8, 9, 21, 22, 358

[56] References Cited

U.S. PATENT DOCUMENTS

| 1,637,780 | 8/1927 | Masury | 248/375 |
|---|---|---|---|
| 2,147,660 | 2/1939 | Loewus | 248/22 |
| 2,706,112 | 4/1953 | Carrier, Jr. | 248/21 X |
| 3,186,674 | 6/1965 | O'Link | 248/358 R X |
| 3,211,491 | 10/1965 | Browne et al. | 248/358 R |
| 3,236,513 | 2/1966 | Nicolaisen | 248/358 R |
| 3,328,085 | 6/1967 | Schwartz | 297/452 |
| 3,565,373 | 2/1971 | Frye | 248/009 |
| 3,770,235 | 11/1973 | Klapproth et al. | 248/399 |

Primary Examiner—Francis K. Zugel
Attorney, Agent, or Firm—Merriam, Marshall & Bicknell

[57] ABSTRACT

A pedestal supports a base frame above which is a seat frame resiliently mounted on the base frame with four energy absorbing devices constituting the sole connection between the base frame and the seat frame. Each energy absorbing device comprises a block of rubber bonded to upper and lower metal plates extending from the block in opposite directions and connected by respective brackets to the seat frame and the base frame respectively. Each block has a bending or flexing surface inclined upwardly and outwardly toward the seat frame.

9 Claims, 5 Drawing Figures

SEAT WITH ENERGY ABSORBING MOUNTING

BACKGROUND OF THE INVENTION

The present invention relates generally to seats for mass transit vehicles such as buses or subway cars, and more particularly to seats of this type having resilient mountings between the seat frame and a base on which the seat frame is mounted.

Typically, a seat of the type in question is mounted on a base which is fixed to the floor or wall or both of a mass transit vehicle, such as a bus. The seat cushions themselves are mounted on a seat frame, separate and discrete from the base, and a resilient or energy absorbing mounting connects the seat frame to the base. Vehicle seats are subject to external forces resulting from bouncing over rough roadways, sudden stops and starts by the vehicle, sharp turns by the vehicle and the like, and the resilient mounting between the base and the seat frame should be able to accommodate all of these forces.

Among prior art attempts to resolve this problem is Klapproth et al. U.S. Pat. No. 3,770,235 which discloses a base frame, a seat frame, separate and discrete from and located above the base frame, and four resilient mounting blocks constituting the sole connection between the base frame and the seat frame. Each mounting block utilizes a relatively complicated arrangement involving a pair of vertically disposed rubber blocks, one nested within the other, and held together by a compression member.

SUMMARY OF THE INVENTION

In accordance with the present invention, a base frame is supported on the floor of the vehicle and a seat frame, separate and discrete from and located above the base frame, is resiliently mounted on the base frame using four energy absorbing mounting devices as the sole connection between the base frame and the seat frame. Each energy absorbing mounting device comprises a block of rubber or rubber-like material and upper and lower plates attached to upper and lower surfaces, respectively, of the rubber block. This energy absorbing device is constructed in such a manner and connected to the base frame and the seat frame in such a manner as to absorb loads or forces applied in an up and down direction, in a back and forth direction, and in a side to side direction. The device also absorbs twisting forces exerted about a vertical axis, twisting forces exerted about a horizontal axis extending from the front to the rear of the seat and twisting forces exerted about a horizontal axis extending from side to side of the seat. The device also absorbs sharp impacts, such as occur when a occupant lurches against the seat in front of him during a quick stop.

Other features and advantages are inherent in the structure claimed and disclosed or will become apparent to those skilled in the art from the following detailed description in conjunction with the accompanying diagrammatic drawing.

DETAILED DESCRIPTION

Figure 1:
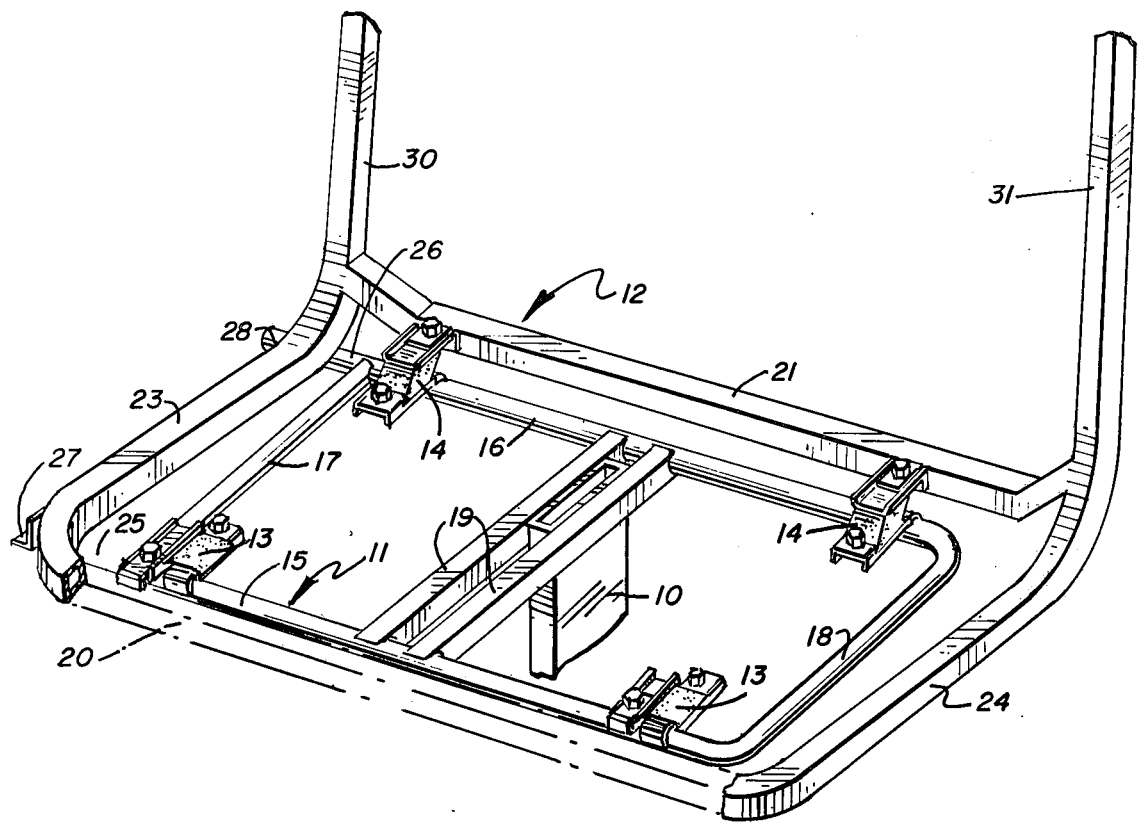
FIG. 1 is a perspective, partially in phantom, of the framework of a seat having an energy absorbing seat frame mounting in accordance with an embodiment of the present invention.
Figure 2:
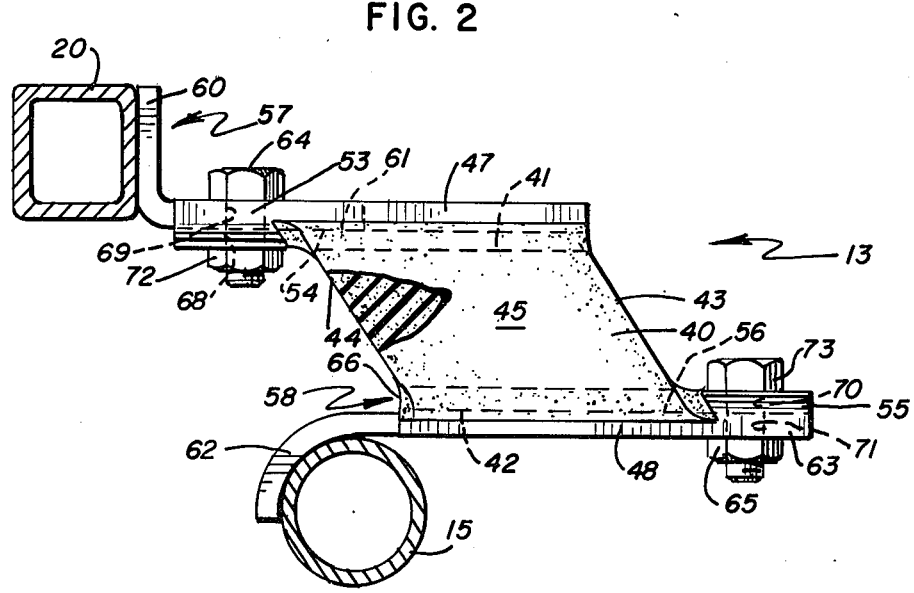
FIG. 2 is a fragmentary sectional view illustrating the energy absorbing mounting device at the front of the seat.

Referring initially to FIG. 1 there is disclosed a seat comprising a pedestal 10 mounted on the floor (not shown) of a mass transit vehicle such as a bus. Pedestal 10 carries a base frame 11 above which is a seat frame 12 resiliently supported on base frame 11 by a pair of front energy absorbing devices or resilient mounting means 13, 13 and a pair of rear energy absorbing devices 14, 14.

Base frame 11 comprises a front member 15 connected to a rear member 16 by a pair of side members 17, 18. Also extending between front and rear members 15, 16 are a pair of intermediate brace members 19, 19 attached to the top of pedestal 10. Front and rear base frame members 15, 16 have respective extensions 25, 26 terminating at wall mounting brackets 27, 28, respectively, for attaching the base frame to the wall of a mass transit vehicle.

Seat frame 12 comprises a front member 20 connected to a rear member 21 by side members 23, 24 having respective upward extensions 30, 31. Energy absorbing devices 13, 14 are cantilevered inwardly relative to front and rear seat frame members 20, 21 respectively.

Front and rear energy absorbing devices 13, 14 are identical and interchangeable, and the connection of energy absorbing devices 13, 14 to base frame 11 and seat frame 12 are identical except that energy absorbing devices 13 face in a forward direction while energy absorbing devices 14 face in a rearward direction. The following discussion of the energy absorbing device will be in connection with the front energy absorbing device 13, but, unless otherwise indicated, what is said in connection with front energy absorbing device 13 is equally applicable to rear energy absorbing device 14.

Energy absorbing device 13 comprises a block 40 of elastic, resilient material such as rubber, silicone rubber or the like. Block 40 includes upper and lower horizontal surfaces 41, 42, respectively, and parallel, inclined inner and outer surfaces 43, 44 extending upwardly from lower horizontal surfaces 42 in an outward direction relative to seat frame front member 20. Block 40 also includes a pair of vertical side surfaces 45, 46 each located between inner and outer inclined surfaces 43, 44. In front energy absorbing device 13, inclined surface 44 faces seat frame front member 20 while in rear energy absorbing device 14, inclined surface 44 faces seat frame rear member 21.

Energy absorbing device 13 also comprises elongated top and bottom plates 47, 48, respectively, each adhesively bonded to upper and lower block surfaces 41, 42 respectively. In a preferred embodiment, each plate 47, 48 is composed of steel plated with brass on the surface bonded to rubber block 40, rubber and brass forming a relatively secure bond.

Top plate 47 comprises an end portion 53 located outwardly of the top edge 54 of outer inclined block surface 44. Bottom plate 48 comprises an end portion 55 located inwardly of the bottom edge 56 of inner inclined surface 43.

For strength-improving purposes, among others, top plate 47 has a pair of upstanding flanges 49, 50, and bottom plate 48 has a pair of depending flanges 51, 52. In addition, flanged plates 47, 48 each define a channel-shaped cross-section for embracing, in keyed relation, an end portion of a respective mounting bracket 57, 58, as described more fully below.

Top plate 47 is connected to seat frame front member 20 by elongated first bracket 57 fixed to seat member 20 (as by welding) and extending longitudinally therefrom in an inward direction relative to seat frame member 20. Bottom plate 48 is connected to base frame front member 15 by elongated second bracket 58 fixed to base member 15 and extending longitudinally therefrom in an inward direction relative to base member 15. First bracket 57 comprises an upstanding bracket portion 60 attached to seat frame front member 20 and an inwardly extending bracket portion 61 connected to end portion 53 of top plate 47 by fastener means (e.g., bolt and nut 64, 72) extending through respective aligned openings 68, 69 in plate end portion 53 and bracket portion 61. Second bracket 58 comprises a downwardly depending bracket portion 62 secured to base frame front member 15 and an inwardly extending bracket portion 63 secured to end portion 55 of bottom plate 48 by fastener means (e.g., bolt and nut 65, 73) extending through respective aligned openings 70, 71 in plate end portion 55 and bracket portion 63.

The sole connection between energy absorbing device 13, on the one hand, and base member 15 and seat frame member 20, on the other hand, consists of said connections at end portions 53, 55 of top and bottom plates 47, 48 respectively. The connection between first bracket 57 and top plate 47 is at a location displaced inwardly from seat frame member 20. Similarly, the connection between second bracket 58 and bottom plate 48 is at a location displaced inwardly from base member 15.

The only surfaces of block 40 covered by metal plates (such as top and bottom plates 47, 48) are upper and lower horizontal surfaces 41, 42. None of the other surfaces of block 40 are covered. Thus, inclined surfaces 43, 44 on block 40 are totally exposed to facilitate unrestricted flexing thereof. Similarly, the two vertical side surfaces 45, 46 on block 40 are also totally exposed, and this, together with the total exposure of inclined surfaces 43, 44 facilitates twisting of block 40.

When a downward load is applied on seat frame front member 20, the total exposure of inclined surfaces 43, 44 permits block 40 to flex or bend downwardly, especially along outer inclined surface 44. In such a situation, the bending moment is in a downward direction about the bottom edge 66 of outer inclined surface 44, and the moment arm extends from seat frame front member 20 to edge 66.

Inclining resilient block surface 44 upwardly and outwardly toward seat frame front member 20, as shown, and keeping surface 44 substantially free of restriction against bending (a restriction which would be present if surface 44 were covered or partially covered by a metal plate) increases the leverage and "give" supplied by the resilient mounting suspension 13, 57, 58 compared to an arrangement in which surface 44 was not inclined as shown or was restricted against bending.

Figure 3:
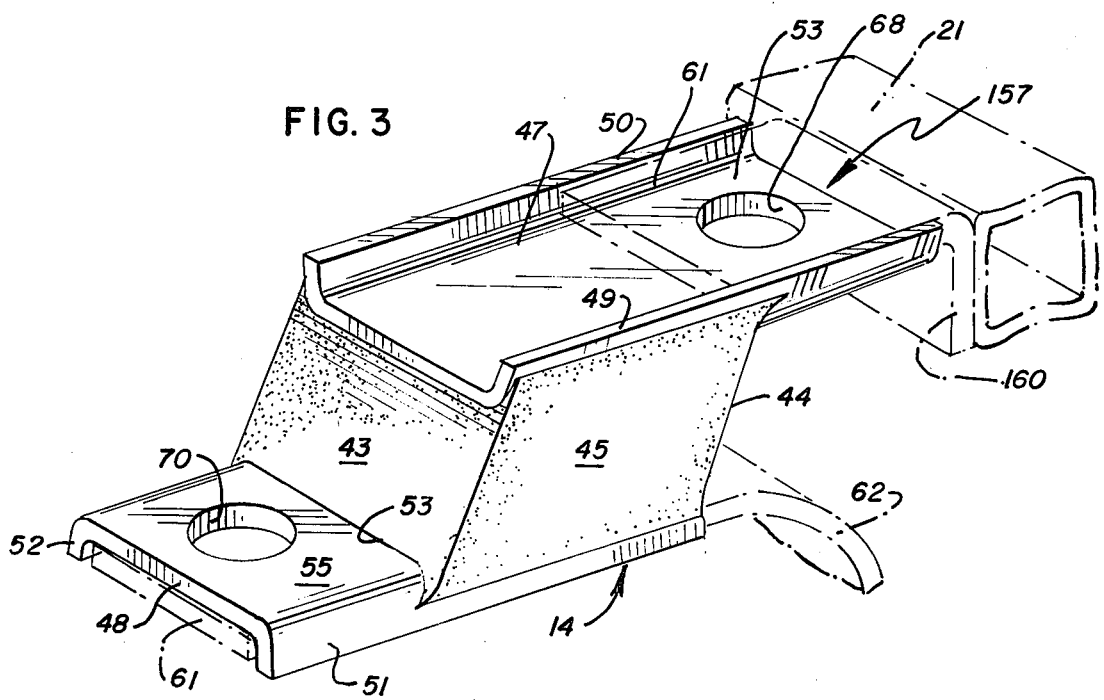
FIG. 3 is a perspective view, partially in section, illustrating the energy absorbing mounting device illustrated at the rear of the seat.
Figure 4:
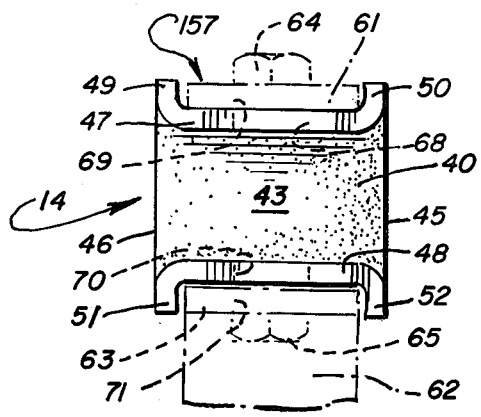
FIG. 4 is an end view of the device of FIG. 3.
Figure 5:
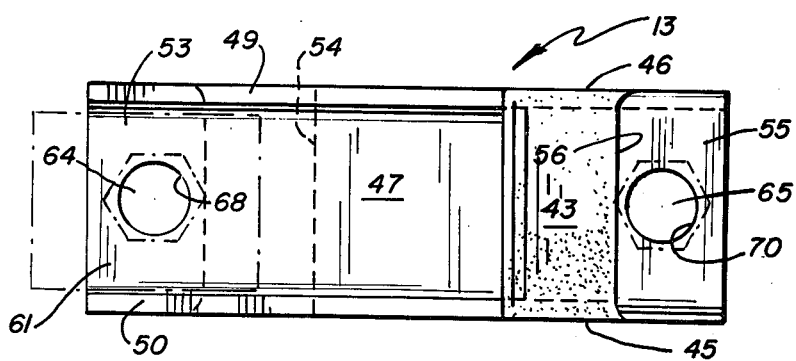
FIG. 5 is a plan view of the device of FIG. 2.

Referring now to FIGS. 3 and 4, illustrating rear energy absorbing device 14, essentially the only difference, not previously discussed, between rear energy absorbing device 14 and front energy absorbing device 13. is with respect to the bracket 157 which connects top plate 47 on energy absorbing device 14 with rear member 21 on seat frame 12. Bracket 157 has a downwardly depending portion 160 in lieu of the upstanding portion 60 on bracket 57 connecting top plate 47 of front energy absorbing device 13 to seat frame front member 20.

The foregoing detailed description has been given for clearness of understanding only, and no unnecessary limitations should be understood therefrom, as modifications will be obvious to those skilled in the art.

What is claimed is:

1. In a seat:
   a base;
   a horizontally disposed seat frame having front and rear members each located above said base;
   front and rear energy absorbing means, cantilevered inwardly from said front and rear members of the seat frame, respectively, for resiliently mounting said respective front and rear members on said base;
   each of said energy absorbing means comprising a block of elastic, resilient material having upper and lower horizontal surfaces and parallel, inclined inner and outer surfaces extending upwardly from said lower surface in an outward direction relative to said seat frame;
   each inclined surface having a bottom edge at said lower horizontal surface and a top edge at said upper horizontal surface;
   top and bottom plates attached to said upper and lower horizontal block surfaces respectively;
   both of said inclined surfaces on each of said blocks being substantially totally exposed to facilitate unrestricted flexing thereof;
   each top plate comprising an end portion located outwardly of the top edge of said outer inclined block surface;
   means for connecting said end portion of said top plate of the front energy absorbing means to the front member of said seat frame;
   means for connecting said end portion of said top plate of the rear energy absorbing means to the rear member of said seat frame;
   and means for connecting the bottom plate of each of said energy absorbing means to said base.

2. In a seat as recited in claim 1 wherein:
   each bottom plate comprises an end portion located inwardly of the bottom edge of said inner inclined block surface;
   said means for connecting the bottom plate comprises means for connecting said end portion to said base; and
   the sole connections of an energy absorbing means to said base and said seat frame consist of said connections at said end portion of the top plate and at said end portion of the bottom plate.

3. In a seat as recited in claim 1 wherein:
   each block comprises a pair of vertical side surfaces each located between said inclined surfaces;
   both of said side surfaces and both of said inclined surfaces being substantially totally exposed to facilitate resilient twisting of the block.

4. In a seat as recited in claim 1 wherein said connecting means for the end portion of each top plate comprises:
   elongated first bracket means fixed to the adjacent seat frame member and extending longitudinally therefrom in said inward direction;

and fastener means for securing said end portion of said top plate to said first bracket means at a location displaced in said inward direction from said adjacent seat frame member.

5. In a seat as recited in claim 7 wherein:
said end portion of the top plate is flanged and defines a channel-shaped cross-section for embracing, in keyed relation, said elongated first bracket means.

6. In a seat as recited in claim 5 wherein:
said bottom plate comprises an end portion displaced in said inward direction from the bottom edge of the inner inclined block surface;
said connecting means for the bottom plate comprises elongated second bracket means fixed to said base member and extending longitudinally therefrom in said inward direction;
and fastener means for securing said end portion of said bottom plate to said second bracket means at a location displaced in said inward direction from said base member.

7. In a seat as recited in claim 6 wherein:
said end portion of each top plate is flanged and defines a channel-shaped cross-section for embracing, in keyed relation, said elongated first bracket means; and
said end portion of each bottom plate is flanged and defines a channel-shaped cross-section for embracing, in keyed relation, said elongated second bracket means.

8. In a seat as recited in claim 6 wherein the sole connections of said energy absorbing means to said base member and said seat frame member consist of said connections at said end portions of the top plates and at said end portions of the bottom plates.

9. In a seat as recited in claim 1 wherein said energy absorbing means, said top and bottom plates and said connecting means comprise means cooperating to absorb forces applied in an up and down direction, in a back and forth direction and in a side to side direction and to absorb twisting forces exerted about a vertical axis, about a horizontal axis extending from the front to the rear of the seat, and about a horizontal axis extending from side to side of the seat.

* * * * *